United States Patent Office 3,069,373
Patented Dec. 18, 1962

3,069,373
MODIFICATION OF POLYEPOXIDE CONVERSION SYSTEMS WITH PETROLEUM RESIN-PHENOL ADDITION PRODUCTS
Sylvan Owen Greenlee, 343 Laurel Drive, West Lafayette, Ind.
No Drawing. Filed Mar. 21, 1960, Ser. No. 16,150
17 Claims. (Cl. 260—28)

This invention relates to phenol addition products of unsaturated petroleum resins, reactive mixtures of such products with polyepoxide, and conversion products of such mixtures.

While chemically resistant, infusible, insoluble materials may be prepared from properly formulated polyepoxide conversion products, many of these formulations based on the commercial polyepoxides leave much to be desired in resistance to aqueous systems. Such weakness, for example, to boiling water and other aqueous systems is often exhibited by protective coatings prepared from the reaction of commercial polyepoxide resins with polyamines containing active hydrogen directly attached to nitrogen or with the widely used amino-amides, such as the commercial products known as "Versamids" prepared from long chain polymerized vegetable oil acids and aliphatic polyamines. Such systems which convert to infusible, insoluble materials through the reaction of an epoxide group with an active hydrogen directly attached to a nitrogen of an amide or amine group result in amide or amine linkages in the tri-dimensional polymer resulting from the conversion reaction. To illustrate, consider the simple cases of the reaction of ethylamine with diepoxy butane and acetamid with diepoxy butane,

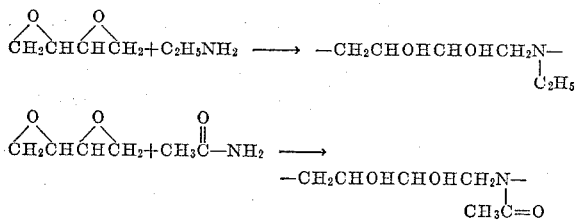

Although the foregoing formulae illustrate the reactions of amides and amines with polyepoxides, in commercial practice the amines and amino-amides are more complex in that they contain a large number of nitrogen attached hydrogen groups per molecule—the number of active hydrogens per molecule normally being at least three and usually many more than three. It is well known that the carbon-nitrogen linkage forming a part of the polymeric structure of the conversion products is one of the more hydrophilic linkages and in order to give satisfactory resistance to aqueous systems the overall polymer must possess sufficient hydrophobic portions to more than neutralize the hydrophilic character of the carbon-nitrogen linkages. In many of the epoxide converting systems consisting of the reaction of polyepoxides with catalysts or with other active hydrogen coupling compounds, the products also lack in the requisite overall hydrophobic character to give the desired resistance to aqueous systems. To illustrate, the conversion products prepared by catalytic polymerization of aliphatic polyepoxides are usually subject to some deterioration as is often exhibited by a whitening of the surface when exposed to boiling water.

It is generally known in the art that in order to prevent deterioration of protective coatings, and plastic objects in general which are to be exposed to the atmosphere, the plastic system must be of such hydrophobic character that water is not absorbed by the polymeric structure through attraction of one of the chemical linkages. It is sometimes possible to attain the desired hydrophobic character of a conversion system by simply building up extremely high molecular weights, although this method is not always applicable. The other method is that of building into the overall polymeric structure sufficient hydrophobic material to repel attraction of water molecules by the polar linkages used in polymerizing this system to the insoluble, infusible state. If molecules of water can make appreciable contact with polar linkages in the conversion system, the water then acts as a solvent for many elements of deterioration such as oxygen, alkali, acids, and salts which will in time destroy the organic materials. On the other hand, if the overall polymeric structure is of such hydrophobic character that water cannot make contact with the polar groups, regardless of how sensitive these groups might be to reaction with water or the other elements which would be solubilized by water, deterioration of the organic material does not occur.

One of the desirable means of introducing the hydrophobic character to conversion systems would be that of introducing hydrocarbon structure which contains relatively few polar linkages in the nature of non-carbon linkages. It is, however, often difficult to find a means of introducing large portions of hydrocarbon structures into the conversion systems due to the lack of proper functionality being present in the hydrocarbon materials. Another difficulty encountered in introducing the hydrophobic type hydrocarbon material into such conversion systems as the polyepoxide conversion mixtures is that of obtaining proper miscibility of all ingredients with each other.

It is accordingly a primary object of the invention to provide novel hydroxyphenylated unsaturated petroleum resins effective, in admixture with polyepoxides to provide hydrophobic conversion systems.

It is an additional object of the invention to provide a method for the preparation of novel hydroxyphenylated unsaturated petroleum resins.

It is a more specific object of the invention to provide a method effective to increase the degree or extent of hydroxyphenylation of unsaturated petroleum resins.

It is an additional primary object of the invention to provide a highly hydrophobic polyepoxide conversion system.

It is a further important object of the invention to provide a reactive mixture of polyepoxides with phenol addition products of petroleum resins which are convertible to infusible, insoluble products characterized by excellent resistance to aqueous systems.

It is an additional object of the invention to provide a polyepoxide conversion system characterized by hydrocarbon structures of a type and in an amount requisite to render such systems hydrophobic.

It is a more specific object of the invention to provide reactive mixtures of hydroxyphenylated, petroleum resins with polyepoxides which constitute highly hydrophobic polyepoxide conversion systems characterized by physical properties requisite for application as protective coatings, impregnants, adhesives and molded objects.

It is an additional object of the invention to provide conversion products of polyepoxide and hydroxyphenylated petroleum resins.

It has now been found that certain resinous phenol addition products of unsaturated petroleum resins possess unusually high hydrophobic character, possess complete miscibility with commercial polyepoxide conversion systems and co-react into the polyepoxide conversion systems through reaction of the phenolic hydroxyl group with a portion of the epoxide groups so as to give highly hydrophobic polyepoxide conversion systems possessing desirable physical characteristics required for applications as protective coatings, adhesives, impregnants and molded objects.

The hydroxyphenylated petroleum resins contemplated by the invention are prepared by the reaction of a phenol selected from the group consisting of the monohydric phenols and the dihydric phenols having at least one unsubstituted ortho or para portion on an aromatic nucleus to which a phenolic hydroxyl group is attached with an unsaturated petroleum resin having an iodine value of from about 100 to about 500, an average molecular weight of from about 250 to about 2500 and containing an average of at least two double bonds per molecule, said material containing at least about 2.5% phenolic hydroxyl by weight, an average of at least about 0.75 phenolic hydroxyl groups per molecule and a total phenol addition of at least about 8% by weight.

Preferred hydroxyphenylated petroleum resins contain at least about 3.5% by weight phenolic hydroxyl. Hydroxyphenyl modified petroleum resins containing 7% or more phenolic hydroxyl by weight are readily prepared, for example, by utilization of dihydric phenols such as resorcinol. The hydroxyphenylated petroleum resins of particular significance accordingly are characterized by a range of from about 3.5% to about 10% by weight phenolic hydroxyl.

The hydroxyphenylated petroleum resins also preferably contain an average of at least about 1.5 phenolic hydroxyl groups per molecule. An appropriate range is from about 1.5 to about 10 phenolic hydroxyl groups per molecule.

The preferred hydroxyphenylated resins also contain at least about 15%, and appropriately from about 15% to about 50% total phenol addition.

The hydroxyphenylated petroleum resins contemplated by the invention may be classified in two categories. A first category is used per se to effect conversion of polyepoxide to infusible products. Inasmuch as the hydroxyphenylated petroleum resins are characterized by a relatively low equivalent weight, resins containing only two phenolic hydroxyl groups per molecule can frequently be utilized to effect conversion of polyepoxides. Hydroxyphenylated petroleum resins preferred for polyepoxide conversion contain at least 2.5 phenolic hydroxyl groups per molecule.

Hydroxyphenylated petroleum resins of the second category contain less than about two phenolic hydroxyl groups per molecule and hence are ineffective alone to convert polyepoxide. Such materials do, however, co-react to be chemically bound into converted polyepoxide systems and are effective to impart hydrophobic character to such systems.

The hydroxyphenylated resins contemplated by this invention are fundamentally distinguishable from the previously known materials designated as "phenolated petroleum resins" described in "Experiment 8" of Patent 2,319,386. Attempts to duplicate such experiment with the petroleum resins contemplated by this specification for the most part resulted in gel formation. The only phenolated derivatives formed were obtained in quite low yields and were characterized by a hydroxyl content of less than two percent by weight. Such products do not uniformly co-react in epoxide conversion systems, and hence fall outside the scope of this invention.

The unsaturated petroleum resins contemplated for use in formation of the phenol addition products embraced by the invention are know to the art. Such resins may be derived from cracking petroleum and from acid polymerization of petroleum fractions. The cracking of petroleum ordinarily yields gasoline which contains appreciable amounts of polymerizable unsaturates which must be removed in order to stabilize the gasoline. The nature of such unsaturated hydrocarbons is very complex, widely varied, and not completely defined as indicated by Wakeman, The Chemistry of Commercial Plastics, Reinhold, New York, 1947, pages 296–301. Such materials are thought to contain unsaturated allocyclic hydrocarbon structures which account for the fairly high degree of unsaturation. The unsaturated petroleum residues are essentially a by-product of petroleum refining, are readily available at a price of 2¢ to about 10¢ per pound and are offered to the market under trade names on the basis of specifications which are normally restricted to physical data and percent unsaturation. Such materials vary from a heavy semi-flowing oil consistency to high melting solids and usually are very dark in color although some of the commercial versions now available are of light color.

Illustrative unsaturated petroleum residues are described in Table I entitled "Unsaturated Petroleum Hydrocarbon Resins." It will be noted that the examples illustrated in the table have iodine values ranging from 119 to 475, molecular weights ranging from 300 to 690, and olefin double bonds per molecule ranging from 2.76 to 6.37. Iodine value (or number) as used in tabulating this data represents the grams of iodine absorbed per 100 grams olefin. The number of double bonds per molecule would then equal $$\frac{\text{Iodine value} \times \text{m. wt}}{254 \times 100}$$

The quantity 254 is the molecular weight of iodine. The equivalent weight to olefin group equals $$\frac{254 \times 100}{\text{Iodine value}}$$

The limits on iodine value, molecular weight and number of double bonds per molecule as tabulated in the table are not all inclusive of the operable unsaturated petroleum resins. Petroleum resins of somewhat higher molecular weight than those reported in the table are available. The contemplated petroleum residues are characterized by iodine values within the range of 100 to 500, molecular weight within the range of 250 to 2500 and of olefin content amounting to at least two double bonds per molecule.

In the following examples, the "Hydropolymer" oil is a low-cost, low-molecular-weight (M.W. about 300) ethylene polymer produced as a coproduct in the manufacture of ethyl chloride by the Ethyl Corporation. It is brown in color but can be distilled to give lighter fractions. This product consists mainly of cyclic olefinic structures having an average of two or more double bonds per molecule. A substantial portion of these double bonds are arranged in conjugated diene systems, suggesting possible uses as a polymerizable material in inks, core oils, drying oils, and surface coatings. Hydropolymer oil alone dries to a hard, non-tacky, resinous film.

TYPICAL PROPERTIES OF "HYDROPOLYMER" OIL

Flash point, ° F. (Cleveland
  Open Cup) _____ 180–190 (82–88° C.)
Fire point, ° F. (Cleveland Open
  Cup) _____ 203–215 (95–102° C.)
API gravity at 60/60° F _____ 23–24
Specific gravity _____ 0.910–0.915
Iodine number (Modified
  Wijs) _____ 430–475
Acid number (mg. KOH/gm.
  oil) _____ 1
Ash, weight percent _____ 0.005–0.014
Viscosity, SSU, at 100° F ____ 80–90
Non-volatile residue content,
  weight percent (by ASTM
  method D154–43) _____ 55
Engler distillation data:

| Percent distilled | Temperature | |
|---|---|---|
| | °F. | °C. |
| 0 | 212 | 100 |
| 5 | 348 | 176 |
| 10 | 384 | 196 |
| 20 | 420 | 216 |
| 30 | 452 | 233 |
| 40 | 480 | 249 |
| 50 | 508 | 264 |
| 60 | 536 | 280 |
| 70 | 564 | 296 |
| 80 | 572 | 300 |
| 86 | 580 | [1] 304 |

[1] Cracking temperature.

The PDO-40 is composed of polymerized olefinic hydrocarbons that are generally cyclic in character and average more than one double bond per molecule. Drying proceeds primarily by evaporation and oxygenation, although additional polymerization of the oxygenated compounds does occur during the hardening period. The molecular weight of the resinous film is about 400. Typical properties of the liquid polymer are:

Specific gravity of 60° F _____ .9,554
Flash (C.O.C.), deg. F _____ 195
Fire (C.O.C.), deg. F _____ 205
Viscosity, SUS/100 deg. F _____ 230
Viscosity, SUS/210 deg. F _____ 44
Pour point, deg. F _____ -35
Bromine number _____ 80
Iodine number _____ 220
Solids content (ASTM D154-43), percent _____ 68
Initial boiling point, deg. F _____ 375

The "Panarez" resins employed in the examples are unsaturated hydrocarbon resins the characteristics of which are given below:

| | Panarez 3-210 | Panarez 6-210 | Panarez 7-210 |
|---|---|---|---|
| Specifications: | | | |
| Softening point, °F | 220-220 | 210-225 | 200-220. |
| Iodine number, Wijs | 195 (min.) | 140 (min.) | 140 (min.). |
| Color, coal tar, max | | | 9. |
| Color, Gardner, max | 11 | 13 | |
| Acid number, max | 1 | 1 | 1. |
| Typical inspections: | | | |
| Softening point, °F | 210 | 215 | 210. |
| Iodine number | 227 | 147 | 160. |
| Color, coal tar | | | 7. |
| Color, Gardner | 10 | 12 | |
| Acid number | Nil | Nil | Nil. |
| Specific gravity, 60/60° F. | 1.049 | 1.106 | 1.091. |
| Pounds/gallon at 60° F. | 8.75 | 9.22 | 9.09. |
| Saponification number. | Nil | Nil | Nil. |
| Ash | Trace | Trace | Trace. |
| Appearance, visual inspection. | Clear, lemon yellow. | Clear, light amber. | Clear, dark brown. |

The invention generally contemplates hydroxyphenylated petroleum resins from all the various monohydric and dihydric phenols. The essential feature of the phenolic reactant is the hydroxyl group hence the presence of the other substituents on the aromatic ring structure is immaterial. Representative preferred phenols include phenol; the alkyl phenols such as ortho-, meta-, and para-cresol; ortho-, meta-, and paraethyl phenol; ortho-, meta-, and para-propyl and isopropyl phenol; ortho-, meta-, and cresol; ortho-, meta-, and para-ethyl phenol; ortho-, meta-, and para-phenyl phenol; xylenol; resorcinol; methyl resorcinol; alpha napthol; and beta napthol.

Hydroxyphenylated unsaturated petroleum resins are produced in accordance with the method of the invention by addition of the phenol reactant to the olefinic double bonds of the resin. As indicated by the ensuing examples it is appropriate to utilize in the reaction mixture at least about three equivalents of the phenol reactant per each equivalent of hydroxyphenyl in the hydroxyphenylated petroleum resin product. Preferably from about 4 to about 10 equivalents of the phenol reactant are so utilized.

In the reaction of phenols with unsaturated petroleum residues, it appears that the phenol is nuclear alkylated by addition at the olefin group. In most cases a part of the phenol adds to the olefin bond by direct addition to form a phenyl ether group. The reaction to form phenyl ether groups in conjunction with hydroxyphenylation has proven to be beneficial to the characteristics of the modified resins in that their miscibility with both the resinous and the nonresinous polyepoxides is greatly enhanced thereby. The enhanced miscibility through the presence of the phenyl ether groups appears to introduce no physical or chemical weakness as the phenyl ether group is very stable toward heat and chemical reactivity.

Various types of unsaturation account for the reported iodine values of the petroleum resins. Only a portion of such unsaturation is receptive to phenol alkylation pursuant to the invention. To provide a more accurate measure of the phenol alkylation receptivity of the various petroleum resins, the maximum degree of phenol alkylation under the conditions of the invention was determined, and the weight of each resin which adds one mole or phenol was calculated. The values so derived were denominated as the "alkylation equivalent weight" of each resin and are reported in the ensuing Table II.

*Table II*

| Petroleum resin | Olefin equivalent [1] | Alkylation equivalent |
|---|---|---|
| Panapol 3E | 100 | 125 |
| Panarez 3-210 | 113 | 330 |
| Panarez 6-210 | 175 | 240 |
| Velsicol EL-528 | 127 | 254 |
| Hydropolymer oil | 56 | 240 |

[1] Weight of resin per olefinic double bond as determined from the iodine value of the resin.

*Table I*

UNSATURATED PETROLEUM HYDROCARBON RESINS

| Petroleum residue and supplier | Percent non-volatile | Soft. pt. or visc. | Iodine value on non-volatile | Molecular weight range | Calculated average double bonds per mol |
|---|---|---|---|---|---|
| Velsicol EL-528 (Velsicol Chemical Corporation) | 100 | 75-80 C (ball and ring) | 200 | 300-400 | 2.76 |
| Velsicol M-144 (Velsicol Chemical Corporation) | 87.5 | 5.0 poises, 9 parts to 1 in toluene | 170 | 300-400 | 2.34 |
| Hydropolymer oil (Ethyl Corporation) | 55 | 0.5 poise | 430-475 | 300 | 5.34 |
| PDO-40 (Sun Oil Company) | 68 | 1.32 poises | 220 | | |
| Panapol 3E (Amoco Chemical Corporation) | 83 | 148 poises, 3.0 poises at 9 parts to 1 of toluene | 253 | 590-690 | 6.37 |
| Panapol 5C (Amoco Chemical Corporation) | 95 | 31.6 poises | 119 | 590-690 | 3.00 |
| Panapol 5D (Amoco Chemical Corporation) | 81 | 123.2 poises | 194 | 590-690 | 4.88 |
| Panarez 3-210 (Amoco Chemical Corporation) | 100 | 93-105 C (ASTM D36-26) | 225 | 690 | 6.10 |
| Panarez 6-210 (Amoco Chemical Corporation) | 100 | 99-107 C (ASTM D36-26) | 145 | 590 | 3.36 |
| Panarez 7-210 (Amoco Chemical Corporation) | 100 | 93-105 C (ASTM D36-26) | 160 | 670 | 4.20 |
| CTLA polymer (Enjay Company Incorporated) | 94 | 3.5 poises, 9 parts to 1 in toluene | 240 | | |

A salient feature of the process of the invention resides in the discovery that the relative degree of hydroxyphenylation is a function of the phenol concentration in the reaction mixture. The alkylation of phenol with Panapol 3E in the presence of boron trifluoride is diverted predominantly to hydroxyphenylation as the proportion of phenol in the reaction mixture is increased above about two mols per alkylation equivalent of the resin. Maximum hydroxyphenylation is achieved when about four mols of phenol per alkylation equivalent of resin is utilized. This is representative of a phenomenon which generally characterizes the phenol alkylation reactions of the invention as the specific phenol and resin reactants and catalysts are varied. Accordingly one aspect of the invention contemplates utilization of at least about twice the amount of phenol theoretically required by the alkylation equivalent of the resin reactant to effect predominantly hydroxyphenylation.

Catalysts which may be employed in accordance with the invention in the production of hydroxyphenylated petroleum resins include Lewis acid type catalysts such as boron trifluoride, aluminum chloride, iron chloride, and antimony chloride and also aluminum phenoxide and the various aluminum alkoxides such as aluminum methoxide, aluminum ethoxide, aluminum propoxide, aluminum isopropoxide and the like. Conversion of such alkoxides to the phenoxide is likely as an excess of the more acidic phenol is present in the reaction mixtures contemplated. Boron trifluoride, aluminum chloride, and aluminum phenoxide are the preferred catalysts.

Of the Lewis acid type catalysts, boron trifluoride has been found to be particularly convenient. Boron trifluoride can be utilized in relatively small amounts either as the gas or one of the liquid adducts such as the ether adduct or the phenol adduct. Regardless of which form is used, the boron trifluoride would likely form the addition product with phenol in the reaction mixture. When boron trifluoride is present in the reaction mixture in catalytic quantities, it is sometimes convenient to carry out the phenol addition reaction in the presence of an organic solvent such as toluene, xylene, or dichlorodiethyl ether; however, if the polymer is sufficiently low in viscosity a solvent is not required. The boron trifluoride catalyst may be conveniently removed at the end of the reaction period by adding water to the reaction mixture. The water apparently hydrolyzes the boron trifluoride thereby terminating its activity. The hydrolyzed boron trifluoride may then be removed by washing the product with hot water. The washing process is also facilitated by having the polymeric reaction mixture dissolved in an organic solvent. In certain preparations it has been found advantageous to merely add a small amount of water to the reaction mixture at the end of the reaction period, mix thoroughly with heating and stirring, and finally remove the water by distillation along with the unreacted phenol and the organic solvent if a solvent has been used.

In the preparation of the phenol addition products using boron trifluoride catalyst, it has been found desirable to carry out the reaction of the unsaturated petroleum resin with the phenol in the temperature range of about 25° C. to 300° C., preferably about 50° C. to about 200° C. The temperature and reaction time varies with the particular combination of phenol and unsaturated petroleum resin used as well as the final properties desired in the phenol addition product.

In general, it has been found that best results are obtained when boron trifluoride is employed in a quantity of at least 0.5% by weight of the unsaturated polymer employed. Excellent results are obtained when boron trifluoride is used in quantities of 0.5% to 5% by weight of the unsaturated polymer.

When employing boron trifluoride catalyst, optimum results are obtained when a stoichiometric excess of phenol is present. Desirably, as much as 2 to 3 mols of phenol per each mol to be added as a hydroxyphenyl group are employed. An examination of infra-red absorption data on the $BF_3$ catalyzed products shows that the hydroxyphenyl groups contain both ortho- and para-substituted structures.

Aluminum chloride, iron chloride and antimony chloride are comparable in activity with boron trifluoride and are employed in a similar manner to give comparable results.

Aluminum phenoxide has also been found to be an excellent catalyst for the hydroxyphenylation of unsaturated petroleum residues. The aluminum phenoxide catalyst desirably is formed by adding aluminum turnings or foil to the phenol to be used in the reaction, and heating with agitation at 150° C. to 250° C., depending on the particular phenol employed, until all of the aluminum is dissolved. Desirably, aluminum is employed in an amount between 0.1% and 5% by weight of the unsaturated petroleum residue. Reactions employing an aluminum phenoxide catalyst desirably are carried out in the temperature range of 50° C. to 300° C., depending on the combination of residue, phenol and catalyst used, the desired characteristics of the final product, and the decomposition temperature of the organic components of the reaction mixture.

Where the presence of the small amounts of aluminum compounds are not harmful to a product in which the hydroxyphenylated material is to be used, no purification of the reaction product is required. If desired, the catalytic activity may be stopped by neutralizing the aluminum phenoxide with an acid such as a mineral acid or acetic acid. The aluminum may be conveniently removed by washing the product (usually solvent solution) with hot water, and adding a sufficient quantity of neutralizing acid to convert the aluminum to a water soluble salt. As with the phenol addition products prepared in the presence of $BF_3$ catalyst, the volatile materials including unreacted phenol conveniently may be removed by distillation under reduced pressure while heating the pot residual product to keep it sufficiently liquid to facilitate agitation throughout the stripping process.

An examination of infra red absorption data on the aluminum phenoxide catalyzed products establishes that the hydroxyphenyl groups comprise both ortho and para-alkylation materials with a predominance of the ortho structure. As with the $BF_3$ catalyst the aluminum phenoxide catalyst gives a good balance between hydroxyphenylation and phenyl ether formation, thus enhancing miscibility with hydrocarbon solvents and polyepoxides, and good reactivity with the epoxide groups.

The hydroxyphenylated petroleum resins useful in the invention frequently demonstrate molecular weights and melting or softening points which are substantially higher than might be anticipated from the basic reactions contemplated. Some reactions which account for such variations as well as hydroxyphenyl content of the final phenol addition products are (a) the polymerization of the olefin double bond in the presence of a catalyst for alkylation and (b) the reaction of one phenol molecule with two double bonds of the unsaturated petroleum resin. The phenol might, for example, form some dialkylation product as well as the monoalkylation material and thus unite two molecules of the petroleum resin thereby doubling the molecular weight as calculated without considering such side reaction. The side reaction of olefin polymerization in the presence of the alkylation catalyst would result in increasing the molecular weight of the final product. Since phenyl ether formation is possible with the contemplated catalyst, an etherification of phenol groups already attached to the unsaturated petroleum residue through hydroxyphenylation may occur. Such reaction would also contribute to an increase in molecular weight.

The detailed procedure followed in preparing the phenol addition products of the petroleum residues using $BF_3$ catalyst as reported in Table III is given as follows:

The phenol dissolved in the indicated solvent (if solvent is used) and the $BF_3$ ether catalyst are placed into a 3-neck flask provided with a thermometer, a mechanical agitator, a one-liter dropping funnel, an electrical heating mantle and a pan of tap water to be used for cooling the reaction if necessary. The reaction mixture is raised to the indicated reaction temperature, and addition of the unsaturated petroleum residue dissolved in the indicated solvent (if a solvent is used) was begun. The addition of the unsaturated petroleum residue is at such rate that the temperature does not rise above the desired reaction temperature, addition is normally carried out over a period of 10-30 minutes applying heat if necessary or cooling the flask externally with a pan of tap water if required to hold the reaction temperature. At the end of the reaction period, toluene or xylene in an amount approximately equal to the weight of the reaction mixture is added slowly through the condenser. In case solvent has been used in the reaction mixture then this solvent takes the place of a part or all of the solvent required in the washing operation. The solvent solution cooled to below 90° C. is then washed with water by heating with continuous agitation for 10-15 minutes at 80° C. and allowed to separate into water and organic layers. In case layering is not satisfactory because of emulsification, 20-50 ml. of acetic acid are added to the wash. The water layer is removed and the washing with 80° C. tap water repeated two more times. In some cases 100 ml. of water are added to hydrolyze the $BF_3$ as a replacement for the three washings. The flask is then provided with a salt-ice-bath cooled receiver and the mixture heated with rapid agitation until the pot temperature reaches 150-160° C. at which point the pressure is reduced to 15-20 mm. of mercury by using a water pump. The batch is held about 15 minutes at this pressure keeping the pot temperature at 150-250° C. depending on the softening point of the final product (softening points as used throughout this description are determined by Durran's Mercury Method, Journal of Oil and Colour Chemists' Association, 12, 173-5 [1929]). In order to keep the hydroxyphenylated petroleum residues sufficiently fluid for good agitation, the pot temperature at this stage is maintained at an estimated 50° C. above the softening point of the final product. The receiving flask is then connected to a vacuum pump and the pressure reduced to 1-5 mm. of mercury holding this pressure for 10-15 minutes, holding the pot temperature of the constantly agitated product at a temperature estimated to be 50° C. above the softening point. The product is poured into a suitable container and allowed to cool.

The general procedure used in preparing the phenol addition products of the unsaturated petroleum resins using aluminum phenoxide catalyst as reported in Table III differs from the above procedure for $BF_3$ preparation as follows:

The aluminum foil or turnings are dissolved in the phenol at a temperature of 150-250° C. as necessary for the specific phenol after which the pot temperature is adjusted to the specified reaction temperature. With all washed batches, sufficient acid is added to convert the aluminum to a water soluble salt. In cases where the batches are not washed, the aluminum may remain as the phenoxide or it may be neutralized with an acid such as acetic acid so that the aluminum would remain in the product as aluminum acetate.

Illustrative preparations of the phenol addition products of unsaturated petroleum resins in accordance with the foregoing procedures are described in Table III entitled "Preparation of Hydroxyphenylated Petroleum Resins" under Examples 1 through 27.

The hydroxyl content of the products identified in Table III was determined by reaction with acetyl chloride and titrating with alkali. An acetyl chloride-toluene solution was prepared by mixing 1.5 mols acetyl chloride with dry toluene to make one liter of solution. Into a 250 ml. iodine flask was pipetted 10 ml. of the acetyl chloride-toluene reagent and the flask chilled in ice water followed by the addition of 2 ml. of pyridine. The flask was tightly stoppered and shaken to form a paste. Add the sample as a 50% solution in toluene in such quantity that there remains in excess 0.5 mol of acetyl chloride for each mol reacted. Gently heat the flask for 20 minutes in a water bath held at about 60° C. When first placing the flask in the bath, momentarily remove the stopper to expel any pressure and reseat firmly. Shake the flask several times during the heating period. Remove from the water bath and chill in ice water. Add 25 ml. of distilled water and shake well. Add a few drops of phenolphthalein indicator and titrate with 0.5 N methanolic KOH. A blank is run in a similar manner. Corrections are made for any free acidity of the sample and any alcoholic hydroxyl content of the basic polyene used in preparation of the hydroxyphenylated composition.

Percent OH $$= \frac{\text{ml. for blank} - \text{ml. for sample} \times N \text{ of } KOH \times 17 \times 100}{\text{grams of sample} \times 100}$$

The percent hydroxyphenyl ($-\phi OH$) was calculated from the percent hydroxyl and as tabulated refers to the percent hydroxyphenyl or hydroxycresyl depending on the specific phenol used.

The percent by weight addition of phenol minus that added as hydroxyphenyl is represented as phenyl ether ($\phi O-$), specific to the phenol used as with the hydroxyphenyl value.

The calculated minimum molecular weight represents a minimum as it did not take into consideration side reactions which tend to increase molecular weights, but merely took into consideration the percent by weight added phenol to the original average molecular weight reported by the supplier on the unsaturated petroleum residue.

The calculated minimum number of phenolic hydroxyl groups per molecule is based on the analytically determined hydroxyl content and the calculated minimum molecular weight.

*Table III*

PREPARATION OF HYDROXY PHENYLATED PETROLEUM RESINS

| Ex. No. | Grams phenol and ml. solvent | Grams polyene and ml. solvent | Mols phenol/ eq. polyene | Catalyst/100 g. polyene | Hours at ° C. | Grams product |
|---|---|---|---|---|---|---|
| 1 | 750 o-cresol | 500 (N.V.) Panapol 3E | 1.39 | 1.00 g. Al | 3 at 200-205 | 850 |
| 2 [1] | 195 o-cresol | 125 (N.V.) Panapol 3E | 1.45 | 1.04 g. Al | 2 at 250 | 213 |
| 3 | 648 o-cresol, 525 xylene | 365 (N.V.) Panapol 3E | 1.65 | 3.42 ml. $BF_3$-ether | 2.5 at 100-105 | 576 |
| 4 | 1,080 o-cresol | 230 (N.V.) PDO-40 | 5.0 | 2.17 g. Al | 3 at 190-195 | 293 |
| 5 | ___do___ | 212 (N.V.) CTLA polymer | 5.0 | 2.36 g. Al | ___do___ | 293 |
| 6 | 564 phenol, 525 xylene | 365 (N.V.) Panapol 3E | 1.36 | 3.40 ml. $BF_3$-ether | 2.5 at 100-105 | 560 |
| 7 | 1,000 phenol | 415 (N.V.) Panapol 3E | 2.58 | 1.20 g. Al | 1.5 at 180-185 | 671 |
| 8 [1] | ___do___ | 250 (N.V.) Panapol 3E | 4.25 | 3.2 g. Al | 3 at 250 | 372 |
| 9 | ___do___ | ___do___ | 4.25 | 10.0 ml. $BF_3$-ether | 1 at 100-105, 2 at 120-125 | 403 |
| 10 | 1,880 phenol | 200 (N.V.) Panapol 3E | 10.00 | 12.5 ml. $BF_3$-ether | 6 at 100-105 | 355 |
| 11 | 188 phenol | 226 Panarez 3-210 | 1.0 | 8.85 ml. $BF_3$-ether | 1 at 100-105, 2 at 120-125 | 280 |
| 12 | 282 phenol | 439 Velsicol EL 528, 337 aromatic | 0.87 | 0.68 g. Al | 1 at 175 | 53 |

*Table III—Continued*

PREPARATION OF HYDROXY PHENYLATED PETROLEUM RESINS—Continued

| Ex. No. | Grams phenol and ml. solvent | Grams polyene and ml. solvent | Mols phenol/eq. polyene | Catalyst/100 g. polyene | Hours at ° C. | Grams product |
|---|---|---|---|---|---|---|
| | | solvent B.P. 171-278. | | | | DD |
| 13 | 188 phenol | 254 Velsicol EL 528 | 1.0 | 7.37 ml. BF₃-ether | 1 at 100-105, 2 at 120-125 | 325 |
| 14 | 470 phenol | 226 Panarez 3-210 | 1.5 | 13.3 ml. BF₃-ether | do | 290 |
| 15 | 940 phenol | do | 5.0 | 17.7 ml. BF₃-ether | do | 291 |
| 16 | 564 phenol, 525 xylene | 439 Velsicol EL 528, 525 xylene | 1.73 | 3.42 ml. BF₃-ether | 2.5 at 100-105 | 544 |
| 17 | 470 phenol | 254 Velsicol EL 528 | 2.5 | 11.8 ml. BF₃-ether | 1 at 100-105, 2 at 120-125 | 336 |
| 18 | 940 phenol | do | 5.0 | 15.75 ml. BF₃-ether | do | 245 |
| 19 | 1,880 phenol | do | 10.0 | 19.7 ml. BF₃-ether | do | 351 |
| 20 | 250 resorcinol, 250 dichlorodiethyl ether | 250 Velsicol M-144 | 1.36 | 4.0 ml. BF₃-ether | | 284 |
| 21 | 500 p,t-butyl-phenol | 250 Panarez 6-210 | | 2.0 g. Al | 3 at 225-220 | 349 |
| 22 | 614 bis(4-hydroxyphenyl) dimethyl methane, 600 dichlorodiethyl ether | 262 (N.V.) Penapol 5D | 2.84 | 9.52 ml. BF₃-ether | 2.5 at 100-105 | |
| 23 | 50 phenol, 150 toluene | 200 (N.V.) Penapol 3E, 150 toluene | 0.27 | 11 g. AlCl₃ | 0.37 at 10-26, 0.20 at 26-47, 0.37 at 47-72 | |
| 24 | 188 phenol, 150 toluene | 50 (N.V.) Penapol 3E, 150 toluene | 4.0 | 266 g. AlCl₃ | 1 at 70-75, 2.5 at 100-105 | 83 |
| 25 | 188 phenol, 200 toluene | 63.5 Velsicol EL 528, 100 toluene | 4.0 | 209 g. AlCl₃ | 2.5 at 100-105 | 84 |
| 26 | 330 resorcinol | 212 (N.V.) CTLA polymer | 3.0 | 4.5 ml. BF₃-ether | 1 at 100-105, 2 at 120-125 | 276 |
| 27 | do | 261 (N.V.) Penapol 5D | 3.0 | 3.81 ml. BF₃-ether | do | |

| Ex. No. | Percent by weight added phenol | Soft pt. and/or visc. | Acid value | Percent weight as OH | Percent weight as —φOH | Percent weight as φO— | Percent phenol addition as —φOH | Eq. phenol used in prep/eq. phenol in product | Percent phenol addition as φO— | Eq. weight | Min. mol. weight | Min. OH/mol. |
|---|---|---|---|---|---|---|---|---|---|---|---|---|
| 1 | 41.2 (35.8) | 102 | 0.6 | 3.66 | 28.2 (20.2) | 18.0 | 56.4 | 3.9 | 43.6 | 465 | 1,080 | 2.34 |
| 2[1] | 41.3 (36.0) | 92 | 0.4 | 3.5 | 22.2 (19.3) | 19.1 | 53.5 | 4.1 | 46.5 | 436 | 1,092 | 2.2 |
| 3 | 36.6 | 89 | 0.6 | 3.6 | 22.8 | 15.8 | 62.2 | 4.9 | 37.8 | 472 | 1,020 | 2.13 |
| 4 | 21.5 | 80 | 2.0 | 2.76 | 17.5 | 4.0 | 81.5 | 21.1 | 18.5 | 616 | | |
| 5 | 30.4 | 85 | 2.0 | 3.42 | 21.7 | 8.7 | 70.8 | 18.8 | 29.2 | 497 | | |
| 6 | 34.8 | 101 | 0 | 2.6 | 14.3 | 20.5 | 41.0 | 7.1 | 59.0 | 652 | 982 | 1.51 |
| 7 | 38.2 | 106 | 0.16 | 3.51 | 19.3 | 21.0 | 48.0 | 8.1 | 52.0 | 485 | 1,035 | 2.1 |
| 8[1] | 32.8 | 104 | 0.2 | 4.16 | 23.8 | 9.0 | 72.6 | 11.3 | 27.4 | 408 | 954 | 2.33 |
| 9 | 38.0 | 119 | 0.2 | 5.09 | 28.2 | 9.8 | 74.2 | 8.8 | 25.8 | 334 | 1,033 | 3.1 |
| 10 | 43.7 | 121 | 1.8 | 4.91 | 27.0 | 16.7 | 61.9 | 19.7 | 38.1 | 346 | 1,138 | 3.28 |
| 11 | 18.6 | 176 | 3.1 | 2.33 | 12.8 | 5.8 | 68.8 | 5.0 | 31.2 | 729 | 849 | 1.16 |
| 12 | 17.2 | 58 | 1.1 | 1.9 | 10.5 | 6.7 | 61.0 | 5.1 | 39.0 | 895 | 423 | 0.47 |
| 13 | 21.8 | 141 | 1.5 | 3.43 | 18.9 | 2.9 | 86.6 | 3.1 | 13.4 | 495 | 448 | 0.91 |
| 14 | 22.1 | 168 | 5.0 | 3.90 | 16.0 | 6.1 | 72.3 | 5.1 | 27.7 | 586 | 886 | 1.51 |
| 15 | 22.3 | 164 | 6.2 | 3.19 | 17.6 | 4.7 | 79.0 | 9.2 | 21.0 | 534 | 888 | 1.66 |
| 16 | 19.3 | 113 | 0.9 | 3.4 | 18.7 | 0.6 | 96.7 | 5.6 | 3.3 | 500 | 424 | 0.85 |
| 17 | 24.4 | 131 | 1.8 | 3.78 | 20.8 | 3.6 | 85.3 | 6.7 | 14.7 | 449 | 463 | 1.03 |
| 18 | 26.4 | 127 | 3.1 | 4.34 | 23.9 | 2.5 | 90.5 | 11.4 | 9.5 | 392 | 475 | 1.21 |
| 19 | 27.6 | 122 | 6.5 | 5.05 | 27.8 | 0 | 100.0 | 19.3 | 0 | 336 | 483 | 1.44 |
| 20 | 12.0 | 100 | 1.4 | 3.2 | 10.3 | 1.7 | 85.5 | 3.9 | 14.5 | 530 | 392 | 0.74 |
| 21 | 28.4 | 130 | 0.7 | 3.1 | 27.4 | 1.0 | 96.5 | 5.2 | 3.5 | 548 | 823 | 1.5 |
| 22 | | | 2.4 | 4.60 | 30.8 | | | | | 370 | | |
| 23 | | | 3.1 | 1.9 | 10.6 | | | | | 885 | | |
| 24 | 39.8 | | 0.44 | 4.84 | 26.7 | 13.1 | 67.2 | 8.5 | 32.8 | 351 | 1,065 | 3.0 |
| 25 | 24.4 | | 1.34 | 3.87 | 21.4 | 3.0 | 87.5 | 10.4 | 12.5 | 439 | 463 | 1.1 |
| 26 | 23.2 | | 6.6 | 6.66 | 21.5 | 1.8 | 92.6 | 5.6 | 7.4 | 255 | | |
| 27 | | | 2.6 | 7.83 | 25.3 | | | | | 217 | | |

[1] Run in pressure autoclave.

The invention generally contemplates mixtures in all relative proportions of phenol addition products of unsaturated petroleum resins with all resinous and nonresinous polyepoxides. Conversion systems containing from about 1 to about 99% by weight of phenol addition product and from about 99 to about 1% by weight of polyepoxide are specifically contemplated. Preferred proportions are from about 5 to about 75 percent by weight of phenol addition product and from about 25 to about 95 percent by weight of polyepoxide.

More specifically, the parts by weight of the hydroxyphenylated-phenyletherated petroleum residues and parts by weight of polyepoxide may be varied widely depending on the particular modified petroleum residue, on the specific polyepoxide, on the type of catalyst or type of active hydrogen coupler used to convert the polyepoxide and the degree of hydrophobic character desired for the specific application. In the case where the polyepoxide conversion system consists of a polyepoxide and an active hydrogen coupler such as an amino or amino-amide compound, the polyepoxide would be used in sufficient quantity to furnish epoxide groups beyond those required to react with the active hydrogen on the amino or amino-amide coupling compound so as to furnish free epoxide groups to react with the phenolic hydroxyl groups of the modified petroleum residue, thus giving a chemically integrated conversion product. In systems using catalysts such as tertiary amines to convert the polyepoxide, the quantity of polyepoxide used is sufficient to react with the phenolic hydroxyl groups of the modified petroleum residue, thus giving a chemically integrated conversion product. In systems using catalysts such as tertiary amines to convert the polyepoxide, the quantity of polyepoxide used is sufficient to react with the phenolic hydroxyl groups of the modified petroleum residue and in addition self-polymerize to give an infusible, insoluble product. Polyepoxides possess a very wide variation in epoxide equivalent weight ranging from 43 for the simplest diepoxide (diepoxybutane) to equivalent weights of several thousand. As observed from the table entitled "Preparation of Hydroxyphenylated Petroleum Residues," there is considerable variation in the functionality of these modified petroleum residues. It will, then, be understood, from the wide variation in functionality of the polyepoxides and also of the modified petroleum residues, that by proper choice of the reactive ingredients to give the desired infusible, insoluble product wide variations in reaction portions are operable.

Illustrative of the epoxide compositions which may be employed in this invention are the complex epoxide resins which are polyether derivatives of polyhydric phenols with such polyfunctional materials as polyhalohydrins, polyepoxides, or epihalohydrins to form polymeric, polyhydric alcohols having alternating aliphatic chains and aromatic nuclei connected to each other by ether linkages. Typical of these complex epoxide resins are the reaction products of bis(4-hydroxyphenyl) dimethyl methane (bisphenol A) with excess molar portions of epichlorohydrin.

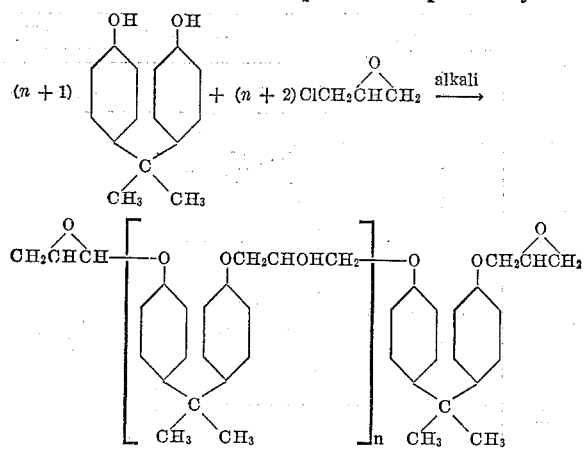

As used in the above formula, $n$ indicates the degree of polymerization and may have the value of 0 or a whole number. Typical of these complex epoxide resins are those marketed by the Shell Chemical Corporation under the trade names of Epon 828, Epon 836, Epon 1001, Epon 1004, Epon 1007, Epon 1009 and Epon 1031.

Another group of resinous polyepoxides useful in reaction with the hydroxyphenylated polymers are the glycidyl ethers of phenol formaldehyde condensates.

The epoxide compositions which may be used in preparing the compositions of this invention also include aliphatic polyepoxides which may be illustrated by such polyepoxides as the polymerization products obtained by polymerizing epoxyalkyl alkenyl ethers such as allyl glycidyl ether through the unsaturated portions to give the so-called polyallyl glycidyl ether (PAGE) having a chemical structure corresponding closely to the following formula:

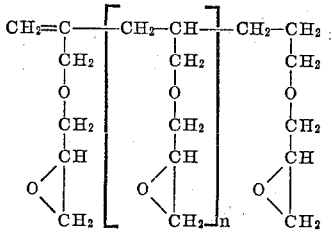

These products in which $n=0$ to about 7 are available in experimental quantities from the Shell Chemical Corporation.

Still other aliphatic polyepoxides which may be used are illustrated by the poly(epoxyalkyl)ethers of polyhydric alcohols. These polyepoxides for instance, may be obtained by reacting a polyhydric alcohol with an epihalohydrin followed by dehydrohalogenation. Illustrative is the reaction, for example, of epichlorohydrin with glycerol in the presence of boron trifluoride to give an intermediate chlorohydrin which is dehydrohalogenated to give a mixed product represented by the following formula:

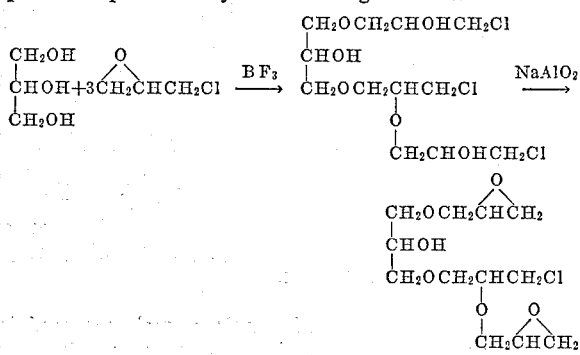

A commercial product of this type is Epon 812 having an equivalent weight to epoxide of approximately 150 and marketed by the Shell Chemical Corporation. The preparation of a large number of these mixed polyepoxides is described more fully in Zech's U.S. Patent 2,581,464.

Epoxidized polyolefins such as epoxidized polybutadienes described in 2,826,556; 2,829,131 and 2,829,135 comprise an additional family of aliphatic epoxides useful in the invention.

Still other aliphatic polyepoxides which have been found to be valuable in reaction with the resinous polyhydric phenols in producing the cured products of this invention include diepoxybutane, diglycidyl ether, limonene diepoxide, and diepoxydicyclopentadiene.

Catalysts which are active in inducing the epoxide groups of the polyepoxides to react with the phenolic hydroxyls of the hydroxyphenylated, phenyletherated polymers include alkaline materials such as sodium phenoxide and organic amines as well as certain acid-type catalysts such as the mineral acids, boron trifluoride, aluminum chloride, and zinc chloride. Preferable catalysts, however, are the alkaline types such as the tertiary amines which tend to favor the reaction of the epoxide group with phenolic hydroxyl groups as compared to the reaction of epoxide group with alcoholic hydroxyl groups, and the use of these tertiary amines in catalytic quantities induces negligible weaknesses towards water, alkali, and chemical resistance as a result of the presence of the amine.

Generally, it is desirable to employ a conversion temperature of between about 100 and 250° C.

Table IV, entitled "Polyepoxide Conversion of Hydroxyphenylated Petroleum Residues," describes the preparation of some protective coating films from reaction mixtures containing the hydroxyphenylated petroleum residues, a polyepoxide and an epoxide converting agent of the catalytic or active hydrogen coupling type. Examples 2a, 3a, 3b, 6a, 6b, 7a, 10a, 16a, 16b, and 21a describe heat conversion of some hydroxyphenylated petroleum residues.

Viscosities were measured by the Gardner bubble viscosimeter.

Film hardness was measured with the Sward hardness rocker setting the value for flat glass plate at 100.

GL hardness-adhesion readings are in number of grams weight required to scratch the film surface in one case and to completely remove the film from the panel in the other case as read on the Graham-Linton hardness tester. The Graham-Linton instrument provides a means of adjusting various pressures of up to 2,000 grams on a sharp knife edge placed vertical to the film surface and dragged along the surface in this position.

The bend tests were run using a Mandrel Set manufactured by Gardner Laboratories, Inc. Wet films of 0.003" thickness were spread on 30 gauge, bright, dry finish, coke tin plates cut to 3 x 5 inch dimensions, cured by baking as indicated in the tables and bent sharply around a steel rod of the size indicated in the column tabulating bend test results.

Other materials and abbreviations used in the tabulated data are described as follows:

Epon X-701: A liquid polymer of allyl glycidyl ether described as polyallyl glycidyl ether (PAGE) having an epoxide equivalent weight of approximately 135.

Epon 828: A bisphenol A-epichlorohydrin type polyepoxide having a softening point of 8–12° C., and an epoxide equivalent weight of 190–210.

Asphalt: An asphalt cement of 120/150 penetration obtained from Socony Mobil Oil Company, Inc.

DMP30: Tris(dimethylaminomethyl) phenol manufactured by Rohm & Haas Company.

Versamid 115: A polyamide prepared by the reaction of polyethylene amines with dimerized vegetable oil acids to give a viscosity of 500–750 poises at 40° C., an amine number of 210–230 and produced by the Chemical Division of General Mills, Inc.

Table IV
POLYEPOXIDE CONVERSION OF HYDROXYPHENYLATED PETROLEUM RESIDUES

| No. | Composition of converting mixture | 0.003″ wet film baked | Rocker hardness | GL surface scratch | GL film removal | Bend test | Color | Viscosity original and after days (d) | Solvents and chemicals in hours at 100° C. | Solvents and chemicals in hours at 25° C. |
|---|---|---|---|---|---|---|---|---|---|---|
| 2a | 50% in xylene, 5 parts Example 2, 1 part X-701, 0.06 part DMP30. | 0.5 hour at 150° C. | 26 | 500 | 1,000 | Well converted but brittle. | | A2, A1 (1d) | $H_2O$, 24+; 50% $H_2SO_4$, 24+; 10% NaOH, 24+; 100% acetic acid, 24+; DMF, 24+. | |
| 3a | 40% in xylene, 4 parts Example 3, 1 part Epon X-701, 0.025 part DMP30. | do | | | | do | | | | |
| 3b | 42% in xylene, 2 parts Example 3, 1 part Epon X-701, 1 part Versamid 115. | do | 78 | 500 | 900 | ⅛″ | 18 | A2, E (1d) | $H_2O$, 27+; 50% $H_2SO_4$, 4; 10% NaOH, 27+; 100% acetic acid, softens. | 28% $NH_3$, 24+; acetone, softens; toluene, softens; 100% acetic acid, softens. |
| 6a | 40% in toluene, 5 parts Example 6, 1 part Epon X-701, 0.03 parts DMP30. | do | | | | Well converted but brittle. | | A4 | | |
| 6b | 45% in toluene, 5 parts Example 6, 3 parts Epon X-701, 2 parts Versamid 115, 0.08 parts DMP30. | do | 50 | 450 | 900 | ⅛″ | 18 | A2, R (1d) | $H_2O$, 69+; 50% $H_2SO_4$, 27+; 10% NaOH, 69+; 100% acetic acid, 5; DMF, 1-. | 28% $NH_3$, 120+; acetone, 120+; toluene, softens; 100% acetic acid, 96. |
| 7a | 51% in xylene, 5 parts Example 7, 3 parts Epon X-701, 2 parts Versamid 115, 0.08 part DMP30. | do | 40 | 500 | 1,000 | ⅛″ | 12 | B, Q (1d), gel (2d). | $H_2O$, 24+; 50% $H_2SO_4$, 1; 100% acetic acid, 1-; DMF, softens. | |
| 10a | 55% in xylene, 3.5 parts Example 10, 1.5 parts X-701, 1.7 parts Asphalt[1]. | 0.25 hour at 150° C. | 50 | | | ¼″ | | | $H_2O$, 24+; 50% $H_2SO_4$, 24+; 10% NaOH, 24+; toluene, 24+. | 100% acetic acid, 24+. |
| 16a | 45% in xylene, 5 parts Example 16, 1 part Epon X-701, 0.03 parts DMP30. | 0.5 hour at 150° C. | | | | Well converted but very brittle. | | | | |
| 16b | 45% in xylene, 5 parts Example 16, 2 parts Epon X-701, 2 parts Versamid 115, 0.07 parts DMP30. | do | 42 | 500 | 1,100 | ⅛″ | | A, Z4 (1d) | $H_2O$, 27+; 50% $H_2SO_4$, 1-; 10% NaOH, 27+; 100% acetic acid, softens. | 28% $NH_3$, 24+; acetone, softens; toluene, softens; 100% acetic acid, softens. |
| 21a | 48% in xylene, 3 parts Example 21, 2 parts Epon 823, 1 part Versamid 115, 0.05 part DMP30. | do | 64 | 300 | 1,100 | ⅛″ | 15 | A1, B (1d), E (2d). | $H_2O$, 24+; 50+ $H_2SO_4$, 24+; 10% NaOH, 24+; 100% acetic acid, 24+; DMF, softens. | |

[1] Asphalt cement of 120/150 penetration obtained from Socony Mobil Oil Company, Inc.

It will be noted as illustrated by Examples 2a, 3a, 6a and 16a that conversion products using minor portions of polyepoxides of high functionality along with the modified petroleum residues tends to give brittle conversion products. This brittle character is conveniently overcome, however, by using flexibilizing converting agents such as the Versamids which contribute active hydrogen for conversion of the polyepoxide and at the same time contribute a chemically integrated flexibilizer. The brittleness of the reaction products of the modified petroleum residues with polyepoxides may also be overcome by using the proper quantity of a polyepoxide which tends to give flexible system.

Excellent plasticizers for the conversion systems based on hydroxyphenylated petroleum residues and polyepoxides are asphalt and coal tar materials. An illustration of the use of asphalt is given in Example 10a. The outstanding solubility of the hydroxyphenylated petroleum residues and their conversion products with asphalt is surprisingly unique and very advantageous from their economy and outstanding chemical resistance. It is generally known that asphaltic materials have outstanding water and aqueous chemical resistance, however, their use is normally limited to applications where soft, solvent soluble, thermoplastic materials will function. As illustrated in Example 10a, such materials may now be used to give formulations capable of thermosetting to water and solvent resistant products. In general the invention contemplates mixtures of the conversion systems of the invention in varying proportions with coal tars and asphalts. Appropriate proportions are from about 90 to about 10 parts by weight of asphalt or coal tar and from about 10 to about 90 parts by weight of a conversion system of the invention.

It will be observed from the data given on resistance to chemicals at 100° C. that the converted products possess unusually high resistance to aqueous systems. The plus sign following the number of hours signifies that there was no observable deterioration at the end of the test, while a minus sign indicates that the point of deterioration was indefinite but below the number given.

In the formulation of products from mixtures of the modified petroleum residues and polyepoxide conversion systems it is often desirable to mix these ingredients with other additives. Such additives may be plasticizers of a non-reactive type or those of an active type which combine into the system through reaction of active hydrogen groups contained therein with the epoxides. The additives may also be pigments and fillers added to give desired variations in physical properties and performance. Other organic resin forming materials may also be incorporated along with the mixture of modified petroleum residues and polyepoxides. Typical resinous materials useful in this respect include the formaldehyde condensates of phenols, melamine and urea, polyester resins, alkyd resins, and epoxy resin esters.

I claim:
1. A hydroxyphenylated petroleum resin prepared by reacting a phenol selected from the group consisting of monohydric phenols and dihydric phenols having at least one of the ortho or para position carbon atoms unsubstituted on an aromatic nucleus to which a phenolic hydroxyl group is attached, with an unsaturated petroleum resin having an iodine value of from about 100 to about 500, an average molecular weight of from about 250 to about 2500 and containing an average of at least two double bonds per molecule, said material containing at least about 2.5% phenolic hydroxyl by weight, an average of at least 0.75 phenolic hydroxyl groups per molecule and a total phenol addition of at least about 8% by weight.

2. The hydroxyphenylated petroleum resin of claim 1 containing at least about 3.5% by weight of phenolic hydroxyl groups.

3. The hydroxyphenylated petroleum resin of claim 1 claiming on the average about 1.5 phenolic hydroxyl groups per molecule.

4. The hydroxyphenylated petroleum resin of claim 1 characterized by a phenolic hydroxyl content of from about 3.5 to about 10% by weight, and characterized by a content of from about 1.5 to about 10 phenolic hydroxyl groups per molecule.

5. A process for preparing a hydroxyphenylated petroleum resin which comprises reacting of a phenol selected from the group consisting of monohydric phenols and dihydric phenols having at least one of the ortho or para position carbon atoms unsubstituted on an aromatic nucleus to which a phenolic hydroxyl group is attached with an unsaturated petroleum resin having an iodine value of from about 100 to about 500, an average molecular weight of from about 250 to about 2500 and containing an average of at least two double bonds per molecule, said material containing at least about 2.5% phenolic hydroxyl by weight, an average of at least about 0.75 phenolic hydroxyl groups per molecule and a total phenol addition of at least about 8% by weight.

6. The process of claim 5 wherein the product is characterized by a phenolic hydroxyl content of from about 3.5 to about 10% by weight and characterized by a content of from about 1.5 to about 10 phenolic hydroxyl groups per molecule.

7. The process of claim 5 in which the reaction is carired out in the presence of an acid type catalyst.

8. The process of claim 5 in which the reaction is carried out in the presence of boron trifluoride at a temperature of between about 25° C. and about 300° C.

9. The process of claim 5 carried out in the presence of an aluminum phenoxide catalyst at a temperature of between about 50° C. and 300 C.

10. The process of claim 5 in which the phenol is present in an amount at least about twice that amount theoretically required by the alkylation equivalent of the petroleum resin.

11. A curable, resinous conversion system comprising a polyepoxide and a hydroxyphenylated petroleum resin prepared by reacting a phenol selected from the group consisting of monohydric phenols and dihydric phenols having at least one of the ortho or para position carbon atoms unsubstituted on an aromatic nucleus to which a phenolic hydroxyl group is attached, with an unsaturated petroleum resin having an iodine value of from about 100 to about 500, an average molecular weight of from about 250 to about 2500 and containing an average of at least two double bonds per molecule, said material containing at least about 0.75 phenolic hydroxyl groups per molecule and a total phenol addition of at least 8% by weight.

12. The conversion system of claim 11 containing from about 5 to about 75% by weight of hydroxyphenylated petroleum resin and from about 25 to about 95% by weight of polyepoxide.

13. The conversion system of claim 11 containing a material selected from the group consisting of asphalts and coal tars.

14. The mixture of claim 13 containing from about 10 to about 90 parts by weight of the conversion system of claim 11 and from about 90 to about 10 parts by weight of a material selected from the group consisting of asphalts and coal tars.

15. A cured resinous material formed by the reaction of a polyepoxide and a hydroxyphenylated petroleum resin prepared by reacting a phenol selected from the group consisting of monohydric phenols and dihydric phenols having at least one of the ortho or para position carbon atoms unsubstituted on an aromatic nucleus to which a phenolic hydroxyl group is attached, with an unsaturated petroleum resin having an iodine value of from about 100 to about 500, an average molecular weight of from about 250 to about 2500 and containing an average of at least two double bonds per molecule, said material containing at least about 0.75 phenolic hydroxyl groups per molecule and a total phenol addition of at least about 8% by weight.

16. The cured material of claim 15 containing a material selected from the group consisting of asphalts and coal tars.

17. The cured mixture of claim 16 containing from about 10 to about 90 parts by weight of the material selected from the group consisting of asphalts and coal tars and about 90 to about 10% by weight of the polyepoxide hydroxyphenylated petroleum resin mixture.

No references cited.